United States Patent [19]

Taufiq

[11] 4,361,591

[45] Nov. 30, 1982

[54] HIGH PROTEIN PASTA PRODUCT

[75] Inventor: Farook Taufiq, Pelham, N.H.

[73] Assignee: The Prince Company, Inc., Lowell, Mass.

[21] Appl. No.: 137,382

[22] Filed: Apr. 4, 1980

[51] Int. Cl.³ .............................................. A21L 1/16
[52] U.S. Cl. .................................... 426/557; 426/451
[58] Field of Search ............... 426/557, 583, 451, 653, 426/656

[56] References Cited

U.S. PATENT DOCUMENTS

| | | | |
|---|---|---|---|
| 2,349,969 | 5/1944 | Kremers | 426/583 |
| 3,911,143 | 10/1975 | Colmey | 426/583 |
| 3,943,264 | 3/1976 | Davis | 426/583 |
| 3,971,857 | 7/1976 | Truda et al. | 426/658 |
| 4,158,069 | 6/1979 | Cox | 426/557 |

*Primary Examiner*—Raymond N. Jones
*Assistant Examiner*—Elizabeth A. Hatcher
*Attorney, Agent, or Firm*—Pearson & Pearson

[57] ABSTRACT

A novel high protein food product characterized by its combination of a high aesthetic quality with a high and balanced protein profile. Also disclosed is a novel process whereby the new product can be extruded into uniform shapes from a relatively "tight" wet mix.

4 Claims, 2 Drawing Figures

HIGH PROTEIN PASTA PRODUCT

BACKGROUND OF THE INVENTION

As used herein, the term "Enriched Macaroni Product With Fortified Protein" refers to high protein macaroni products conforming to Standard of Identity established by Food and Drug Administration, an agency of the United States of America, under Title 21 of the Code of Federal Regulations (CFR) 139.117. The term "Enriched Macaroni Product" refers to ordinary everyday macaroni and spaghetti products that conform to FDA's standard of identity 21 CFR 139.115. As used herein, the term "Wheat Flour" includes the entire family of wheat flour products, more commonly known as Semolina, Farina, Durum Flour, Hard Wheat Flour, Spring Wheat Flour and Clear Flour.

Cox et al, in U.S. Pat. No. 4,158,069 discuss the regulatory requirements of "Enriched Macaroni Product With Fortified Protein" and teach higher protein macaroni product, using semolina (78-89%); Dried Whey (5-22%); Calcium Caseinate (4-8%); L-Lysine (0.75); Calcium Hydroxide (0.1%) and Wheat Gluten (1-1.5%). Although the Cox formulation uses Denatured Whey (35% to 50% protein), it does not blend well with semolina, and the resultant macaroni product has white spots throughout. Although the problem can be corrected partially by using semolina of a finer grind, it cannot totally be corrected because of the relatively hygroscopic nature of the whey constituent.

In the prior art, Grindstaff et al, in U.S. Pat. No. 4,120,989 discloses a new manufacturing process for denaturing whey protein concentrate, using a food grade emulsifier, which is compatible with whey protein and wheat flour. This resultant product is available commercially from Stauffer Chemical Company Food Ingredient Division.

Grindstaff also purports to teach the production of "Enriched Macaroni Product with Fortified Portein," using semoline (80-95%); Denatured Whey (5-20%); Emulsifier (0.3-0.6%) and Soy Protein Isolate (0.8%). The formulation containing 5% whey and 95% semolina (Table II Example 15) results in a product containing only 15.35% protein, while the formulation in same Table Example 11 results in 18.65% protein. Both of these examples fail to meet the FDA's minimum requirement of 20% protein. Using the Grindstaff et al procedure, a minimum of 16% whey is needed to arrive at 20% protein level. At that high level of whey the macaroni product loses its typical characteristics. The product with 16% whey and 84% semolina results in foaming of cooking water, and extremely soft and mushy texture of cooked product. The cooked product also has chalky mouth-feel and taste foreign to typical macaroni product.

Another product known to the art is a high-protein macaroni material believed to comprise Durum Flour, Soy Flour, Whey Protein and lactalbumin. It is also known in the prior art to form a high-protein macaroni product from wheat germ and lysine. Such a product, highly nutritious, is so lacking in acceptable aesthetic quality that it is not commercially acceptable.

It is axiomatic in the food industry that clever and inexpensive advances in nutritional value of food products have no beneficial import unless the advantage aesthetic quality of food is accepted by the consumer.

SUMMARY OF THE INVENTION

It is a principal object of the invention to provide an improved pasta product, e.g., a product of the macaroni or spaghetti type.

It is a particular object of the invention to provide an aesthetically pleasing food product that combines very high nutritional value with excellent aesthetic qualities.

It is still another object of the invention to provide a novel high-protein pasta ingredient formed of a caseinate and whey, which can be incorporated into pasta formulae without interfering unduly with the aesthetic qualities of the final product.

The Protein Efficiency Ratio (PER) is measured by the method disclosed in the Official Procedure of the Association of Official Analytical Chemists, 10th Edition 1975, Ref. 43.183 on Page 857.

A particular object of the invention is to provide an enriched macaroni with fortified protein that will have a minimum protein content of 20% and a Protein Efficiency Ratio of about 2.375 or more and preferably of 2.5 or more.

A further object of the invention is to provide a novel process for forming, i.e. extruding, uniformly-sized pieces of food product from tight doughs associated with the most favored formulations of the invention.

Other objects of the invention will be obvious to those skilled in the art on their reading of this disclosure.

The above objects have been substantially achieved with the use of a high-protein additive formed of calcium caseinate, a milk derivative, and whey. The materials are intimately combined in intra-particle relationship. Relative quantities of whey and caseinate are about equal, each material being from 40 to 60% of the composition. This additive, properly prepared, provides a balanced, high-protein material which can be incorporated into a pasta product of excellent aesthetic quality. In utilizing the product in some favorable formulations, one encounters problems in extrusion of uniform-sized material. This is apparently caused by the "tight" nature of the dough. Applicant has discovered that this problem may be successfully overcome if he reduces flow resistance to extruded segments near the center portion of the die relative to that at the outer edges of the die. One such flow-modifying construction with use of a screen comprises large perforations near the center thereof and a gradient of perforations to smaller perforations near the center circumference of the screen.

It is preferred that the particles, each comprising an intimate blend of caseinate and whey, be below about 0.005 in. effective sieving diameter. Such a small diameter is usually sufficient to allow sufficient moisture penetration into the particle, as it is processed in a wet mix, to obtain good homogeneity. It is preferred that the particles pass a 150 mesh screen. In this connection it is noted that a preferred food product incorporating the caseinate/whey additive composition is one comprising 80-85% of a wheat flour such as semolina, farina, durum flour or the like; about 8% soya flour, about 7% wheat gluten and 5% of the additive. The soy flour can be substituted with about 6% of soy protein concentrate known to the art or 4.5% soy protein isolate known to the art. When such substitution is made the balance can be made up with wheat flour. The caseinate/whey particles have a bulk density of between 0.2 and 0.3 grams per cubic centimeter, preferably about 0.25 grams per cubic centimeter.

DESCRIPTION OF A PREFERRED EMBODIMENT

Figure 1:
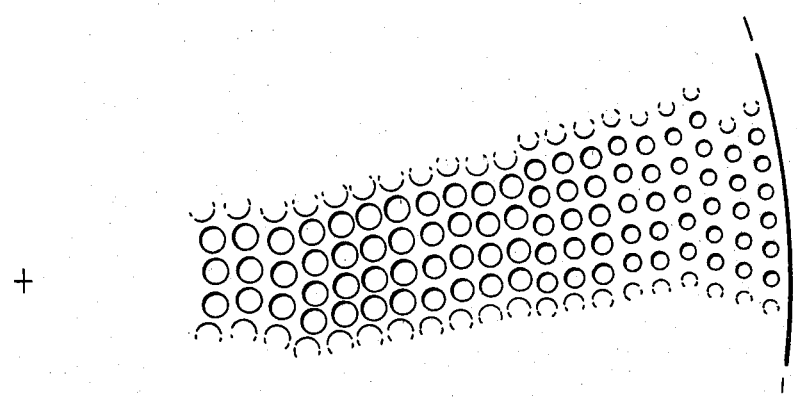
FIG. 1 illustrates a portion of a typical screen pack used in extruding the product of the invention.

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best-suited in the condition of a particular case.

EXAMPLE 1

This example illustrates the manufacture of a novel whey-caseinate additive composition that is found to be of particular value.

An aqueous blend containing 2% by weight whey protein concentrate, 2% by weight of food grade calcium caseinate and 96% water is well-mixed and heated to about 83 degrees C. for about 18 minutes. During this period, the whey is denatured to about 60%. (A more complete denaturization is acceptable, but the time-temperature profile of the process should be limited to avoid formation of curd in the mixture.)

The resulting mix is then cooled and finally spray-dried, according to procedures well-known in the food processing art to provide a powdered product having a 5% moisture content. The product is screened to pass a 150-mesh screen before further use.

The particle size of the product is important. If it is too large, penetration of moisture to the interior of the particle will not be achieved during the convenient processing cycles and thus the resultant particles will not be readily assimilated into pasta compositions without some undesirable effect on the appearance.

Typical analysis of the caseinate/denatured whey powder:

| | | |
|---|---|---|
| | Moisture | 5% |
| | Protein | 50% |
| | Lactose | 26% |
| | Ash | 12% |
| | Fat | 1% |
| | PH | 6.6 |
| | PER* | 2.9 |

*"PER" is the "protein efficiency ratio" well known in the pasta art."
Note the lactose level is about 25%

EXAMPLE 2

| | |
|---|---|
| Wheat Flour | 50% |
| Soy Flour (52% Protein) | 8% |
| Wheat Gluten | 7% |
| Example 1 Product | 5% |

Seventy parts of the above-listed formulaie are blended with thirty parts of water (total moisture), all according to the manipulative steps well-known to the pasta processing art. The blended products are then processed into ravioli or other pasta configurations. If extrusion of macaroni and the like is desired, the discussion of novel extension techniques set out below should be reviewed.

The dried ready-to-package product has a protein content of 22.6% and a PER value equal to that of casein, i.e., 2.5.

EXAMPLES 3–7

Each of the following formulations is processed in like manner to form pasta products. In each case 70% of the dry mixture was mixed with 20 parts water. The dry mixture itself contained about 14% moisture, so total water content was about 30%.

| | | |
|---|---|---|
| (3) | Wheat Flour | 82% |
| | Wheat Gluten | 7% |
| | Soy Protein Concentrate, 70% protein | 6% |
| | Whey P.C./Cal Caseinate | 5% |
| (4) | Wheat Flour | 83.5% |
| | Wheat Gluten | 7.0% |
| | Whey P.C./Cal. Caseinate | 5% |
| | Soy Protein Isolate, 90% protein | 4.5% |
| (5) | Durum Whole Wheat Flour | 80% |
| | Soy Flour | 8% |
| | Wheat Gluten | 7% |
| | Whey P.C./Calcium Caseinate | 5% |
| (6) | Durum Whole Wheat Flour | 82% |
| | Wheat Gluten | 7% |
| | Soy Protein Concentrate | 6% |
| | Whey P.C./Calcium Caseinate | 5% |
| (7) | Durum Whole Wheat Flour | 83.5% |
| | Wheat Gluten | 7.0% |
| | Whey P.C./Calcium Caseinate | 5.0% |
| | Soy Protein Isolate | 4.5% |

The flour was white in appearance with some specks visible. It is noted that the specks were substantially hidden after the extrusion of the wet mix.

EXAMPLE 8

This example describes the procedure by which the extrudable, water mixed composition of the invention are extruded. As a general rule, these materials can be extruded through conventional equipment; however, the compositions have unique rheological properties that tended to prevent with the flow distribution through forming dies. As a consequence shorter (or smaller depending on the terminology appropriate for a given product shape) pieces of product would be cut from part of the dye. This presented a problem in terms of the ability to produce a product that would cook uniformly and also in producing a product that could be handled and packaged most readily.

Figure 2:
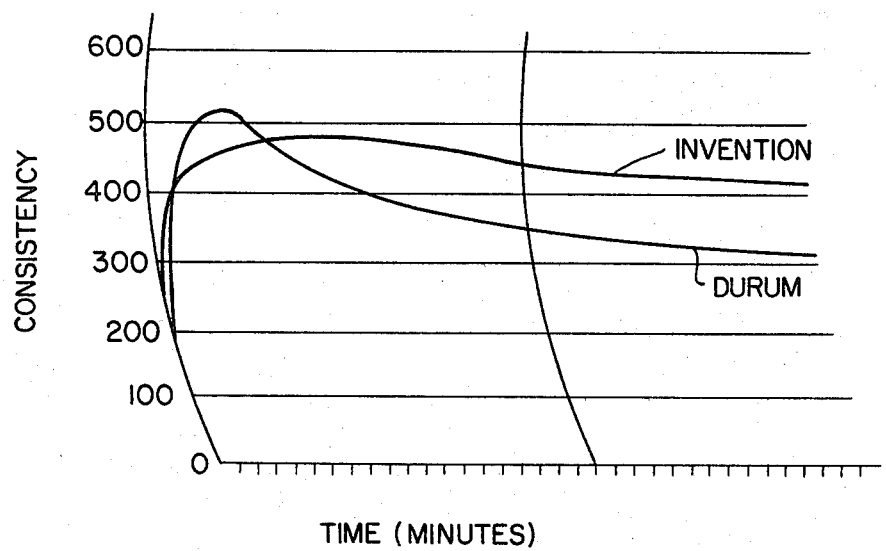
FIG. 2 is a graph which illustrates the novel properties of a prepared wet mix of the invention.

The flour of the invention yields an unusually "tight" or strong pasta dough. This characteristic may be measured by the Farina-Plasto test on equipment known in the art and available from C. W. Brakender Instruments, Inc. The pasta mix of the invention yields a consistency value of in excess of 400 on such a test, as opposed to a value about 100 points lower for a pasta mix with durum flour. It is believed that this consistency, in considerable part due to the high gluten content, contributes to the extrusion problem. These higher and lower consistencies are seen in the curves in FIG. 2.

It was found that the problem could be overcome by using a flow-resistance profile novel between the screw of the extruder and the face of the extrusion die. The flow modifying structure is suitably one which contains apertures offering a relatively high flow resistance, for example smaller apertures or longer apertures, at the outer periphery of the die and apertures offering a relatively high flow resistance, for example, larger or shorter apertures at the central portion of the die shown in FIG. 1.

A convenient way of achieving the desirable flow pattern is to use varying sized holes in a screen positioned behind the die. However, where the extruder design allows it, the relative flow resistance can be achieved by using a screen with similarly sized holes and achieving the flow resistance by forming longer flow paths through the holes at the outer most circumference. Moreover, it is possible where one wishes to dedicate an extrusion die to the process of making the parts products of the invention to so configure a die that the side facing the extrusion screw in disk-faced and comprises longer apertures near the outermost circumference. Those skilled in the art will realize that the precise dimensions can be calculated in each case with attention to the flow properties of the material as it is extruded and the known relationships for pressure drops. As a practical matter, once one realizes the general solution to the problem, it is probably as easy to determine the parameters by trail for each individual extrusion system.

In any event, the use of this flow-distribution system is a substantial deviation from earlier extrusion processes in the pasta art and is an important advantage in providing a convenient, saleable product.

The total number of holes in a screen depends on diameter of the screen. However, the number of holes in each row increases toward the circumference of the plate. Consequently, the innermost circle may have 36 holes while the outermost may have 160 holes. During extrusion of high protein dough, the pattern of extrusion changes drastically fast. By using a screen, that has larger holes in the center and smaller holes near circumference, this pattern can be corrected. As a result, the flow of dough around circumference is restricted somewhat, while it is free near center of die. Diameter of all 20 rows of holes in a typical 15" die are listed below:

1. 0.244" (Innermost row near center)
2. 0.235"
3. 0.216"
4. 0.205"
5. 0.205"
6. 0.198"
7. 0.198"
8. 0.198"
9. 0.198"
10. 0.198"
11. 0.184"
12. 0.184"
13. 0.184"
14. 0.164"
15. 0.164"
16. 0.158"
17. 0.140"
18. 0.140"
19. 0.140"
20. 0.140" (Outermost row near circumference)

The dry blend is conveniently mixed with water in the mixer trough of commercially available equipment, e.g., the trough of the MOdel Demaco S-25 Press sold by DeFrancisci Machine Corporation. Mixing is continued for 10 minutes or until homogeneity is achieved. Thereupon extrusion can be carried out. Drying is carried out according to manipulative procedures common in the art. It is noted that typical macaroni-style product will dry in 12 hours at 40 degrees C. and 75% relative humidity.

It is also to be understood that the claims are intended to cover all of the generic and specific features of the invention herein described and all statements of the scope of the invention which might be said to fall therebetween.

I claim:

1. A pasta product formed of about 5% of a proteinaceous additive material consisting essentially of calcium caseinate and a partially denatured whey composition said additive comprising approximately equal portions of said composition and said caseinate in intimate intra-particle relationship having an average particle size of less than about 0.005 inch and further containing about 80% wheat flour; about 8% soy flour and about 7% wheat gluten.

2. A process for making an improved, high-protein, wheat-based, pasta product comprising a high protein additive in addition to other ingredients including about 80% wheat flour, some gluten, soy protein source, and water, said process comprising the step of (1) intimately mixing into said other ingredients about 5% of a protein additive, in the form of small particles of less than about 0.005 inch average particle size which comprises an intimate and wetable intra-particulate mixture of calcium caseinate and denatured whey, wetting said additive to a homogeneous state during said mixing, and shaping a resulting product to form said wheat-based, pasta product.

3. A process as defined in claim 2 wherein said shaping of said product is through a screw extruder, said process comprising the step of placing between the screw and said extruder and a shaping die forming the outlet from said extruder, flow-resisting apertures having a graded flow resistance from a lower resistance for apertures near the outer perimeter of the die to a higher resistance for apertures near a central region of said die.

4. A process as defined in claim 3 wherein the said extruded material has a Farinagraph of about 400.

* * * * *